Oct. 31, 1933.    J. W. ALLEN ET AL    1,933,404
CONVEYER
Filed Jan. 20, 1932    3 Sheets-Sheet 1

Inventors:
JOSEPH WALLACE ALLEN and
ELMER FRANK OBLEY.
by:
their Attorneys.

Oct. 31, 1933. J. W. ALLEN ET AL 1,933,404
CONVEYER
Filed Jan. 20, 1932 3 Sheets-Sheet 2
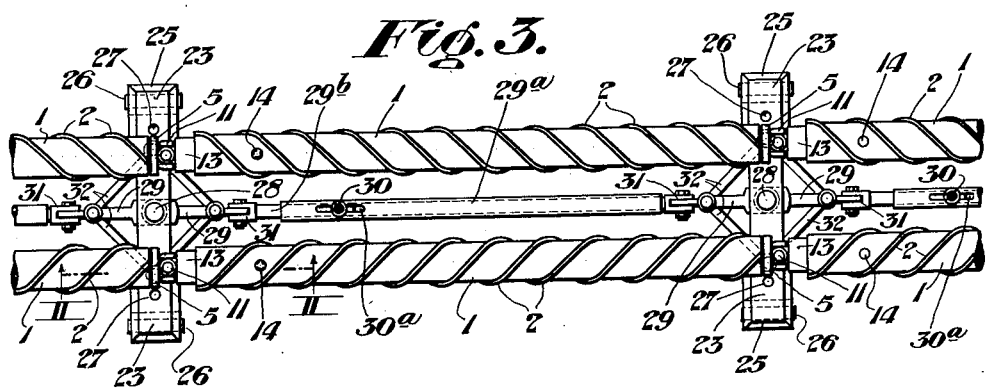
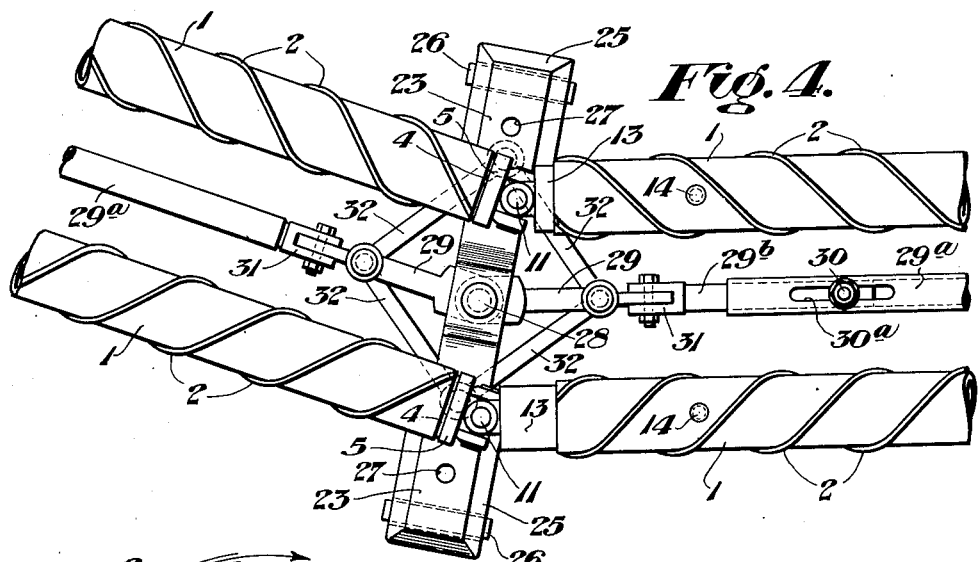
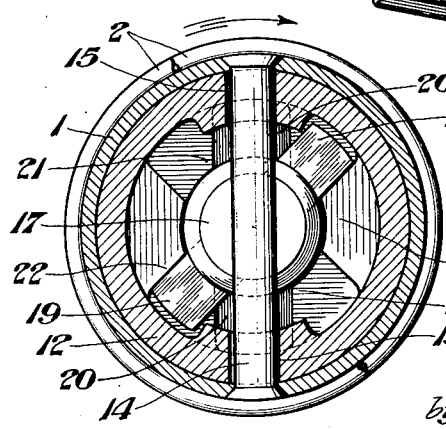
Inventors:
JOSEPH WALLACE ALLEN and
ELMER FRANK OBLEY.
by Meima + Reuber
their Attorneys.

Oct. 31, 1933.   J. W. ALLEN ET AL   1,933,404
CONVEYER
Filed Jan. 20, 1932   3 Sheets-Sheet 3

Inventors:
JOSEPH WALLACE ALLEN and
ELMER FRANK OBLEY.
by:
their Attorneys.

Patented Oct. 31, 1933

1,933,404

UNITED STATES PATENT OFFICE 1,933,404

CONVEYER

Joseph Wallace Allen and Elmer Frank Obley, Clairton, Pa.

Application January 20, 1932. Serial No. 587,829

17 Claims. (Cl. 198—213)

This invention relates to conveying means, and more particularly to a conveyer comprising a plurality of driven shafts provided with means for propelling along the shafts, during rotation thereof, articles placed upon such shafts.

In the patent to John J. Armstrong and Robert F. Woodford, issued December 8, 1925, No. 1,564,926, there is disclosed a screw conveyer comprising threaded shafts for propelling therealong articles upon such shafts during rotation thereof, and a driving unit for rotating the shafts in opposite relation. This conveyer is portable so as to be moved readily from one scene of operation to another. It is frequently necessary to handle articles which are disposed laterally of the general direction of feed of the conveyer. Our invention has to do more particularly with means for permitting of lateral bending or positioning of the conveyer for disposing the receiving or discharge end thereof adjacent articles at either side of the main portion of the conveyer.

One of the main objects of our invention is to provide a conveyer of the character stated, which is of comparatively simple and inexpensive construction and is capable of lateral bending or flexing in such manner as to obviate the necessity of employing a supplemental conveyer for delivering to or from the main conveyer articles disposed to or to be delivered from either side of the latter.

A further object is to provide means for facilitating lateral bending or positioning of the conveyer while maintaining the proper relation between the shafts thereof. It is also an object of our invention to provide a conveyer so constructed that it is capable of both lateral and vertical flexing or bending. Further objects and advantages will appear from the detailed description.

In the drawings:

Figure 3 is a fragmentary plan view of the conveyer with the parts disposed thereof for transporting articles in a straight line.

Figure 4 is a fragmentary plan view of the conveyer with the parts disposed for conveying articles about a curve or bend.

Figure 5 is a section taken substantially on the line V—V of Figure 2 on an enlarged scale.

Figure 2:
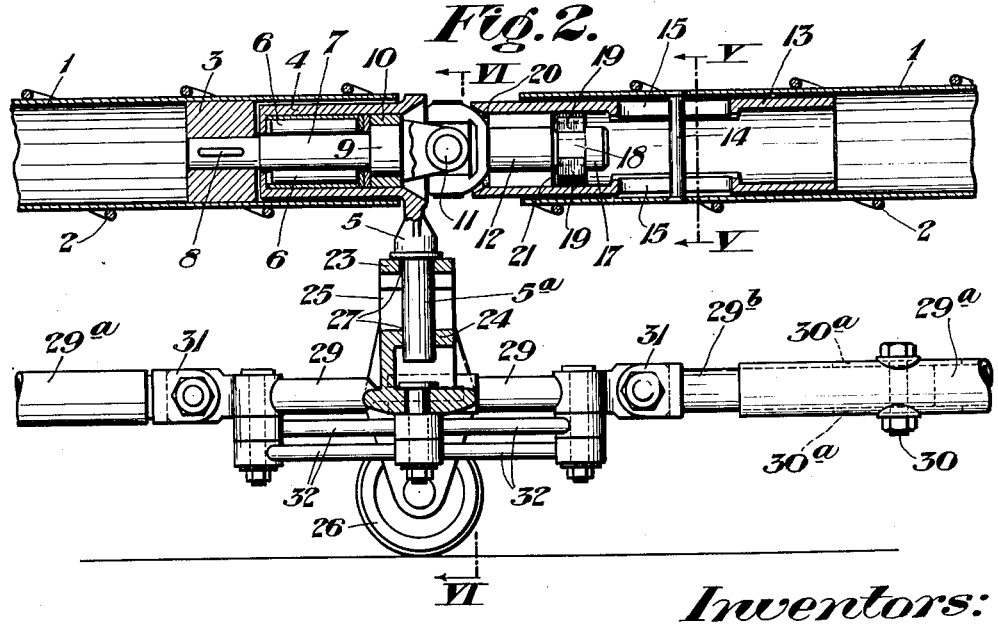
Figure 2 is a section taken substantially on the line II—II of Figure 3, parts being shown in elevation.
Figure 6:
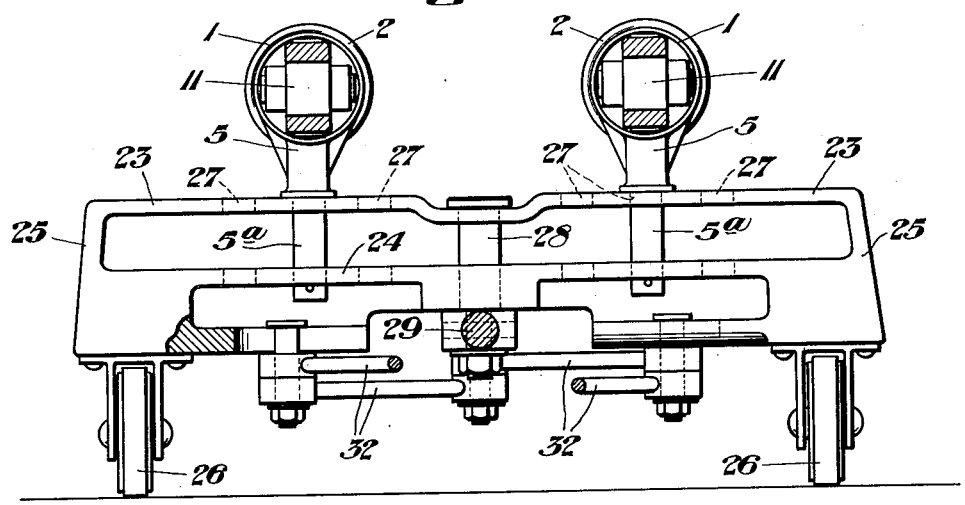
Figure 6 is a sectional elevation on the line VI—VI of Figure 2.
Figure 7:
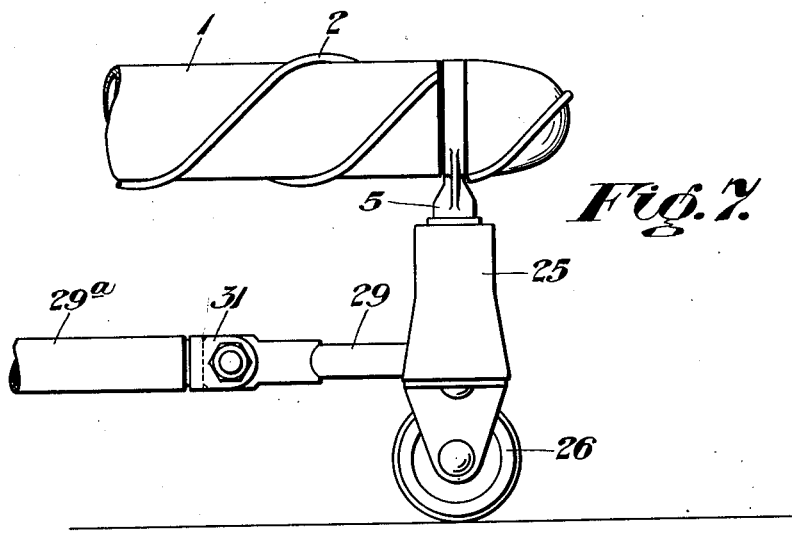
Figure 7 is a fragmentary elevation of one of the terminal ends of the conveyer.

The conveyer comprises two driven shafts which include a plurality of sections 1 disposed in endwise relation. Preferably, these sections are of tubular construction, as shown in Figures 2 and 5. The sections of each shaft are suitably supported at the ends thereof and the adjacent ends of the sections are connected together by a driving connection which is laterally flexible and telescopes one of the shaft sections so as to permit a relative lateral movement thereof.

Preferably, the driving connection between the shaft sections includes a universal joint whereby the sections are capable of relative vertical movement as well as relative lateral movement. The conveyer thus constructed comprises a plurality of sections capable of both relative lateral movement and relative vertical movement while maintaining the drive between the sections of the respective shafts.

Each of the shaft sections 1 is provided with an element 2 secured helically about the same and constituting an external thread for the shaft section. The threads of the two shafts are oppositely related and the shafts are driven in opposite and proper directions for propelling along the shafts, by means of the threads 2, articles placed thereon. Any suitable power unit may be used for driving the shafts in the manner described above.

Each shaft section 1 is provided, adjacent one end thereof, with a collar 3 suitably secured within the shaft section, as by welding or in any other suitable manner. A bearing sleeve 4, carried by an upright 5, extends into the end of the shaft section to within a short distance of the collar 3. This sleeve receives roller bearings 6 which support a stub shaft 7, the inner end portion of which has a driving connection with the collar 3, as by means of a rib or integral key 8 on the shaft which projects into a corresponding groove in the collar 3. Adjacent its outer end the stub shaft 7 is provided with a head 9 rotatably mounted in a bushing 10 suitably secured in the sleeve 4. The outer end of the stub shaft 7 is connected by a universal joint 11, of known type, to the outer end of a stub shaft 12 which projects into a relatively long sleeve 13 which fits snugly into the end of the next adjacent shaft section thereof, and is slidable therein. Each of the shaft sections 1 is, as mentioned above, provided at one end with a collar 3 and associated parts and at the other end with a sleeve 13 and associated parts.

The sleeve 13 has a driving connection with its associated shaft section 1 by means of a pin 14 secured through such shaft section diametrically thereof and passing through slots 15 in the sleeve. The stub shaft 12 is provided, at its inner end, with a head 17 connected to the body portion of the shaft by a reduced neck 18. Lugs 19 project radially from the neck 18 at diametrically opposite points thereof. These lugs are insertable through slots 20 extending through a shoulder 21 which projects inwardly of the sleeve 13 adjacent the outer end thereof. In coupling together the shaft sections, stub shaft 12 is inserted into the sleeve 13, as in Figure 2.

Assuming that the driving unit is to be left as considered in Figure 2, and that the conveyer shaft is driven in a clockwise direction, as considered in Figure 5, the lugs 19 contact lugs 22 so as to drive the shaft section in which the sleeve 13 is mounted. In this manner a driving connection is established between the successive sections of respective shafts and, as above pointed out, this connection is laterally flexible and telescopic so that the shaft sections, and consequently the sections of the conveyer, are capable of relative lateral movement.

Each of the uprights 5 is provided with a downwardly extending shank 5a which fits through alined openings in web elements 23 and 24 of a supporting member 25 of approximately elongated inverted U-shape. Preferably, this member is supported by rollers 26 suitably mounted at the ends of member 25. The uprights 5 are thus mounted upon the supporting member 25 for relative turning movement and constitute therewith supporting structures which, in conjunction with the driving connections, support the adjacent ends of the shaft sections. Conveniently, each of the supports is provided with a plurality of openings 27 for the reception of the shanks of the uprights 5 to permit of adjustment of the conveyer shafts toward and away from each other to suit the articles being handled.

It will be noted that the supporting structures serve to support the shafts in predetermined spaced relation and to maintain corresponding sections of the shafts in parallel relation.

Each of the supports 25 is provided, at its center, with a vertically disposed pin 28 on which links 29 are pivotally mounted for transverse pivotal movement. The links 29 form end sections of spacing ribs which extend between the supports 25. The main units of the spacing ribs are composed of telescoping sections 29a and 29b adapted to be secured together by a bolt 30 passing through elongated slots 30a, and said main units are secured to the links 29 by vertically movable pivotal connections 31. Suitable diagonally disposed reach rods 32 are pivotally connected to each of the links 29 and are pivotally connected to the supports 25 adjacent the ends of said supports so that when the conveyer shaft sections are moved transversely the supports 25 will be compelled to follow the movement of the moved sections, due to the forces delivered through the reach rods 32.

Figure 1:
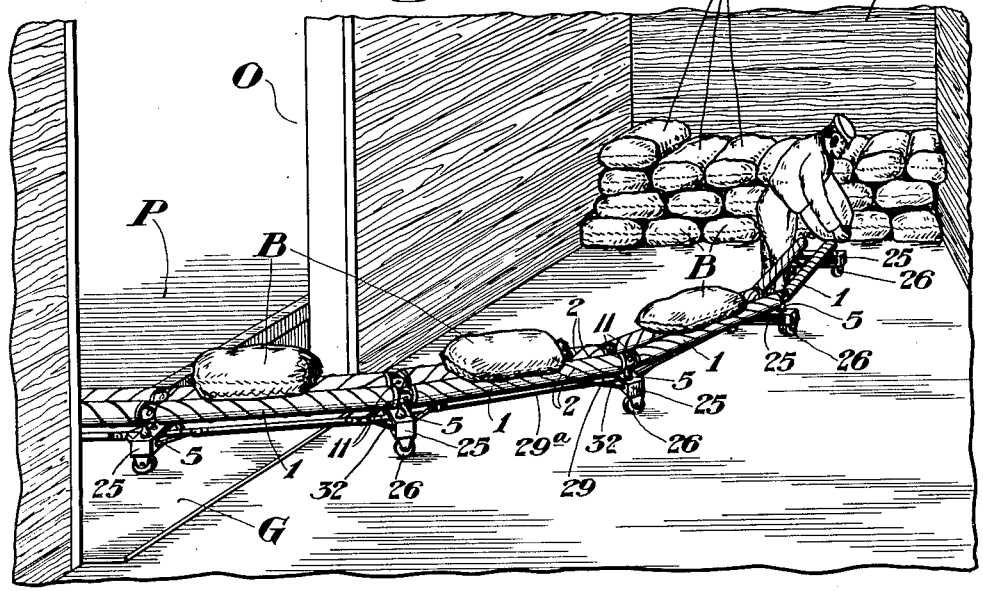
Figure 1 is a perspective side view of a conveyer constructed in accordance with our invention, in use.

In Figure 1 of the drawings we have illustrated our conveyer as being used for removing articles such as bags B of material from a box car C disposed adjacent a receiving platform P, the conveyer extending through the door opening O of the car and being in part supported by a gang plank G extending between the car and the platform. The general direction of the main portion of the conveyer is approximately at right angles to the length of the car. In order that the articles may be placed upon the conveyer with facility, the end portion thereof extending into the car is bent into an arc so as to dispose the receiving end of the conveyer closely adjacent the articles to be handled, as illustrated.

This bending or flexing of the conveyer laterally is permitted by the laterally flexible and telescopic driving connections between the sections of the conveyer shafts, together with the pivotally mounted spacing ribs which extend between the supports 25. Under ordinary conditions, the main portion of the conveyer is straight, as in Figure 3. When the conveyer is bent laterally the spacing ribs which connect the supports 25 deliver sufficient force to the supports 25 to cause said supports to move with the flexed conveyer shafts so as to cause a longitudinal telescopic movement of the adjacent shaft sections, and thereby permit the shaft sections to retain the laterally spaced positions.

In curving or flexing the conveyer assembly laterally the shaft sections at the inner side of the curve are shortened and sections at the outer side of the curve are increased in length, as clearly shown in Figure 4. Adjustments or variations in length are accommodated by telescopic driving connections, previously described. Also, since the connections between the shaft sections include universal joints, such sections have relative vertical movement. The vertical movement of the shaft sections is allowed for in the spacing ribs by the pivotal connection of said ribs and by the longitudinal telescopic construction of the main units of said ribs. It is frequently desirable, for convenience in handling articles on the conveyer, to raise the terminal ends of the conveyer so as to mount said conveyer in an elevated position on or over a stack or pile of the articles being handled.

When the conveyer is being used for unloading a car, such as shown in Figure 1, and it is desired to move the conveyer from one end of the car to the other, the conveyer as a whole is moved outwardly from a door opening O of the car a sufficient distance to permit the end portion thereof to be swung toward the other side or end of the car, after which the conveyer is moved back into the car and the portion of the conveyer in the car is curved on an arc, as shown in Figure 1, but in the opposite direction.

It will be understood that at the discharge and receiving ends of the conveyer the reach rods 32 and the links 29, which would normally extend outwardly from the supports 25, are removed so as not to interfere with the packs or other articles being handled by the conveyer.

While we have shown and described one specific embodiment of our invention it will be understood that we do not wish to be limited thereto, since various modifications may be made without departing from the scope of our invention, as defined in the appended claims.

We claim:

1. In conveyer means of the character described, two driven shafts disposed in spaced relation and provided with means to contact articles placed upon the shafts and propel such articles along the shafts during rotation thereof, the shafts being of flexible and telescopic construction for permitting lateral movement of a selected portion of the conveyer relative to the remainder thereof while maintaining the drive of the shafts.

2. In conveyer means of the character described, two driven shafts provided with means to contact articles placed upon the shafts and propel such articles along the shafts during rotation thereof, and means for supporting the shafts and for holding them in predetermined spaced relation, the shafts being of flexible and telescopic construction for permitting lateral movement of a selected portion of the conveyer relative to the remainder thereof while maintaining the drive of the shafts.

3. In conveyer means of the character described, two driven shafts provided with means to contact articles placed upon the shafts and propel such articles along the shafts during rotation thereof, each shaft including a plurality of sections disposed in endwise relation, and laterally flexible and telescopic driving connections between the adjacent ends of the sections of the respective shafts and permitting relative lateral movement between the sections of the conveyer while maintaining driving connections between the shaft sections.

4. In conveyer means of the character described, two driven shafts provided with means to contact articles placed upon the shafts and propel such articles along the shafts during rotation thereof, each shaft including a plurality of sections disposed in endwise relation, means for supporting the shaft sections and for holding them in predetermined spaced relation, and laterally flexible and telescopic driving connections between the adjacent ends of the sections of the respective shafts and permitting relative lateral movement between the sections of the conveyer while maintaining driving connections between the shaft sections.

5. In conveyer means of the character described, two driven shafts provided with means to contact articles placed upon the shafts and propel such articles along the shafts during rotation thereof, each shaft including a plurality of sections disposed in endwise relation, means for supporting the shaft sections and for holding them in predetermined spaced relation, and universal and telescopic driving connections between the adjacent ends of the sections of the respective shafts permitting relative movement between the sections of the conveyer both vertically and laterally while maintaining driving connections between the shaft sections.

6. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, spacing means connecting said structures, and laterally flexible and telescopic driving connections between the adjacent ends of the sections of the respective shafts.

7. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, spacing means connecting said structures, and universal and telescopic driving connections between the adjacent ends of the sections of the respective shafts.

8. In a conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, spacing rods connecting said structures at the transverse centers thereof, and laterally flexible and telescopic driving connections between the adjacent ends of the sections of the respective shafts.

9. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, spacing rods connecting said structures at the transverse centers thereof, and universal and telescopic driving connections between the adjacent ends of the sections of the respective shafts.

10. In conveyer means of the character described, two driven shafts provided with means to contact articles placed upon the shafts and propel such articles along the shafts during rotation thereof, each shaft including a plurality of sections disposed in endwise relation, wheel mounted and spaced supporting structures supporting the shaft sections and holding them in predetermined spaced relation, laterally pivotal and longitudinally extensible spacing members connecting the supporting structures at the transverse centers thereof, and laterally pivotal and telescopic driving connections between the adjacent ends of the sections of the respective shafts.

11. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, laterally flexible and longitudinally extensible spacing means connecting said structures at the transverse centers thereof, and universally flexible and telescopic driving connections between the adjacent ends of the sections of the respective shafts.

12. In conveyer means of the character described, two driven shafts provided with means to contact articles placed upon the shafts and propel such articles along the shafts during rotation thereof, each shaft including a plurality of sections disposed in endwise relation, supporting structures supporting the shaft sections at the ends thereof and holding them in predetermined spaced relation, laterally pivotal spacing members of appreciable rigidity connecting the supporting structures at the transverse centers thereof, and laterally pivotal and telescopic driving connections between the adjacent ends of the sections of the respective shafts.

13. In conveyer means of the character described, two driven shafts provided with means disposed to contact articles placed thereon and propel them along the shafts during rotation thereof, each shaft including a plurality of sections disposed in endwise relation, supports at the ends of the shaft sections, uprights mounted for turning movement in the supports and each provided with means for rotatably supporting one of the adjacent shaft sections at the end thereof, and laterally flexible and telescopic driving connections between each of the shaft sections supported by the uprights and the end of the next adjacent shaft section, said connections also supporting the end of said next adjacent shaft section.

14. In conveyer means of the character described, two driven shafts provided with means disposed to contact articles placed thereon and propel them along the shafts during rotation thereof, each shaft including a plurality of sections disposed in endwise relation, supports at the ends of the shaft sections, uprights mounted for turning movement in the supports and each provided with means for rotatably supporting one of the adjacent shaft sections at the end thereof, laterally flexible and telescopic driving connections between each of the shaft sections supported by the uprights and the end of the next adjacent shaft section, said connections also supporting the end of said next adjacent shaft section, and spacing members of appreciable rigidity connecting the supports at the transverse centers thereof.

15. In conveyer means of the character described, two driven shafts provided with means disposed to contact articles placed thereon and propel them along the shafts during rotation thereof, each shaft including a plurality of sections disposed in endwise relation, means for rotatably supporting the ends of adjacent shaft sections, said supporting means having turning movement relative to the supports and including laterally pivotal and telescopic driving connections between the adjacent shaft section ends, and laterally pivotal spacing members of appreciable rigidity connecting the supports at the transverse centers thereof.

16. In conveyer means of the character described, two driven shafts provided with means disposed to contact articles placed thereon and propel them along the shafts during rotation thereof, each shaft including a plurality of sections disposed in endwise relation, and driving connections between the adjacent ends of the shaft sections, said connections including two universally connected members extending into the ends of the shaft sections, and having driving connection therewith, one of said members telescoping its associated shaft section.

17. In conveyer means of the character described, two driven shafts provided with means disposed to contact articles placed thereon and propel them along the shafts during rotation thereof, each shaft including a plurality of sections disposed in endwise relation, and driving connections between the adjacent ends of the shaft sections, said connections including two universally connected members extending into the ends of the shaft sections, one of said members having driving connection with its associated shaft section, and a sleeve slidable in the end of the other shaft section and having driving connection therewith, the other of said members extending into and having driving connection with the sleeve.

JOSEPH WALLACE ALLEN.
ELMER FRANK OBLEY.